United States Patent
Vella et al.

(10) Patent No.: US 11,932,769 B2
(45) Date of Patent: Mar. 19, 2024

(54) PRINTABLE FLEXIBLE OVERCOAT INK COMPOSITIONS

(71) Applicant: Xerox Corporation, Norwalk, CT (US)

(72) Inventors: Sarah J. Vella, Milton (CA); Yujie Zhu, Mississauga (CA); Biby Esther Abraham, Mississauga (CA); Kurt I. Halfyard, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 595 days.

(21) Appl. No.: 16/722,970

(22) Filed: Dec. 20, 2019

(65) Prior Publication Data

US 2021/0189158 A1    Jun. 24, 2021

(51) Int. Cl.
| | |
|---|---|
| C09D 11/02 | (2014.01) |
| C08K 5/053 | (2006.01) |
| C08K 5/06 | (2006.01) |
| C08K 5/07 | (2006.01) |
| C08K 5/10 | (2006.01) |
| C08K 5/45 | (2006.01) |
| C08L 75/04 | (2006.01) |
| C09D 11/102 | (2014.01) |

(52) U.S. Cl.
CPC ............ *C09D 11/102* (2013.01); *C08K 5/053* (2013.01); *C08K 5/06* (2013.01); *C08K 5/07* (2013.01); *C08K 5/10* (2013.01); *C08K 5/45* (2013.01); *C08L 75/04* (2013.01); *C08L 2201/54* (2013.01); *C08L 2207/04* (2013.01)

(58) Field of Classification Search
CPC ....... C09D 11/102; C09D 11/30; C08L 75/04; C08L 2201/54; C08L 2207/04

USPC ......................................................... 523/161
See application file for complete search history.

(56) References Cited

U.S. PATENT DOCUMENTS

| | | | | |
|---|---|---|---|---|
| 6,136,890 A | * | 10/2000 | Carlson | C08G 18/0804 528/69 |
| 2009/0266788 A1 | * | 10/2009 | Chang | H05K 3/061 524/548 |
| 2014/0015912 A1 | * | 1/2014 | Brandstein | C09D 11/322 347/110 |
| 2015/0037550 A1 | * | 2/2015 | Balasubramaniam | H05K 1/097 427/125 |

FOREIGN PATENT DOCUMENTS

| | | | |
|---|---|---|---|
| EP | 3736313 A1 | | 11/2020 |
| KR | 10-2015-0016095 A | | 2/2015 |
| WO | WO 96/23844 | * | 8/1996 |
| WO | 2014113937 A1 | | 7/2014 |
| WO | WO 2014/113937 | * | 7/2014 |
| WO | 2016073465 A1 | | 6/2021 |

OTHER PUBLICATIONS

Extended European search report mailed in corresponding application No. EP20211705.7-1102/3838995 dated Jun. 11, 2021, 6 pages.

* cited by examiner

*Primary Examiner* — Doris L Lee

(57) ABSTRACT

A printable flexible overcoat ink composition that can be digitally printed is disclosed. For example, the printable flexible overcoat ink composition includes a mixture of a thermoplastic polyurethane (TPU) and a solvent. The mixture is mixed to have a viscosity of 1 centipoise to 2,000 centipoise to allow the mixture to be digitally printed via an inkjet printhead or an aerosol jet printhead.

11 Claims, 1 Drawing Sheet

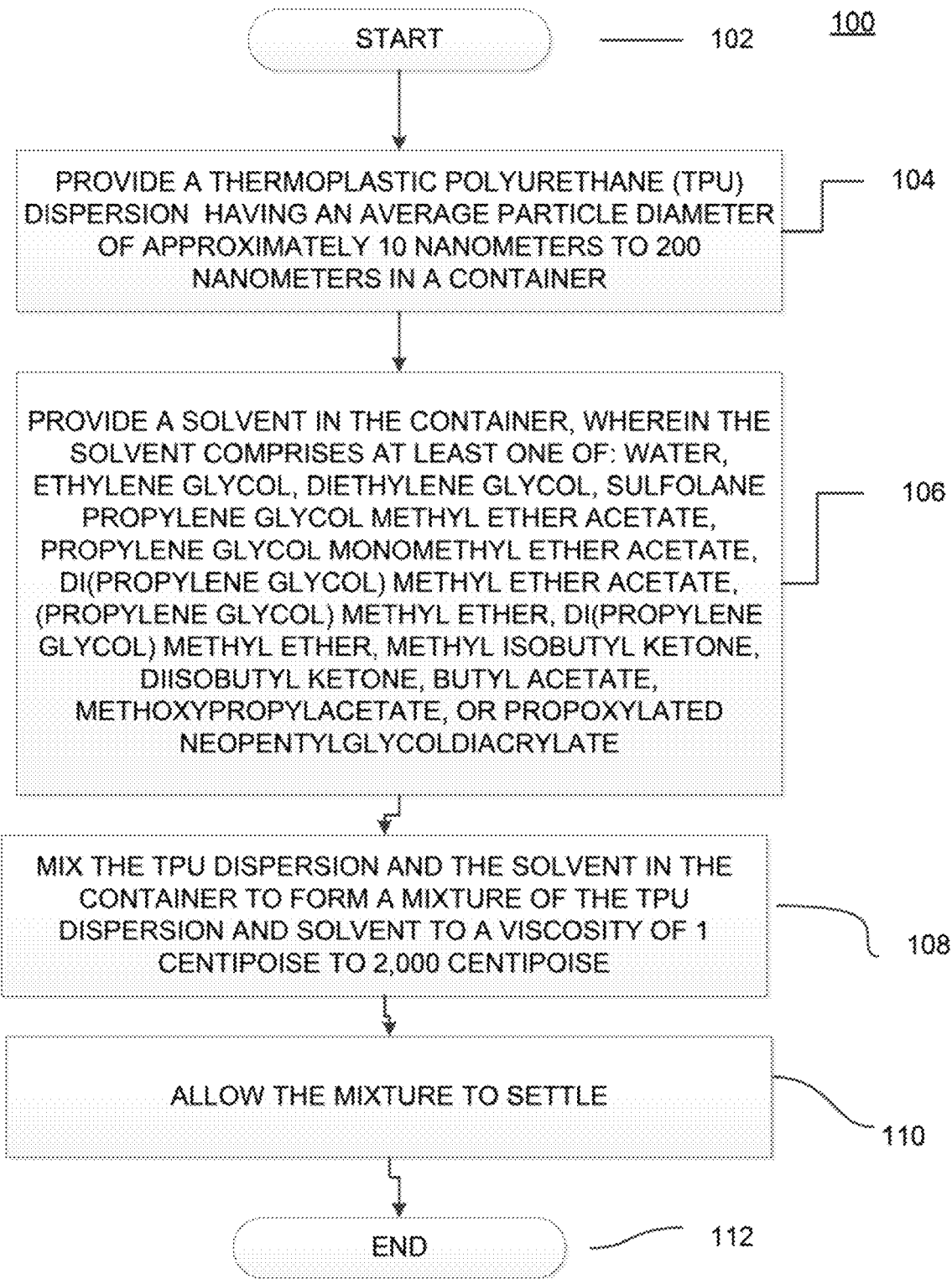

PRINTABLE FLEXIBLE OVERCOAT INK COMPOSITIONS

The present disclosure relates generally to ink compositions and, more particularly, to a printable flexible overcoat ink composition for printed electronics.

BACKGROUND

Printed electronics is an emerging industry that aims to print low cost electronic components to add function to otherwise inanimate objects. For example, printed electronics can be used to add functionality to clothing, sporting equipment, storage containers, and the like.

Unlike conventional electronics, printed electronics are not restricted to rigid substrates. Digitally printable conductive inks that are currently available are generally not flexible, often suffer from low scratch resistance, and can have poor adhesion to substrates. Due to these factors, the application of these digitally printable conductive inks has been limited in a number of areas that use highly robust circuitry.

For instance, conductive circuits for smart packaging must survive long-distance shipping and rough handling. Although a great effort has been made to develop flexible conductive inks, there are few digitally printable products showing up in the market. The few that do exist do not have the high conductivity required for many of these emerging applications.

SUMMARY

According to aspects illustrated herein, there are provided a printable flexible overcoat ink composition and a method for producing the same. One disclosed feature of the embodiments is a printable flexible overcoat ink composition comprising a mixture of a thermoplastic polyurethane (TPU) and a solvent, wherein the mixture has a viscosity of 1 centipoise to 2,000 centipoise to allow the mixture to be digitally printed.

Another disclosed feature of the embodiments is a printable flexible overcoat ink composition that comprises a mixture of a thermoplastic polyurethane (TPU) and a solvent, wherein a ratio of the TPU to solvent comprises approximately 1:4 to 2:1 and a total solid content of the TPU in the mixture comprises approximately 2 percent to 80 percent.

Another disclosed feature of the embodiments is a method for producing a printable flexible overcoat ink composition. The method includes providing a thermoplastic polyurethane (TPU) dispersion having an average particle diameter of approximately 10 nanometers to 200 nanometers in a container, providing a solvent in the container, wherein the solvent comprises at least one of: water, ethylene glycol, diethylene glycol, sulfolane, propylene glycol methyl ether acetate, propylene glycol monomethyl ether acetate, di(propylene glycol) methyl ether acetate, (propylene glycol) methyl ether, di(propylene glycol) methyl ether, methyl isobutyl ketone, diisobutyl ketone, butyl acetate, methoxypropylacetate, or propoxylated neopentylglycoldiacrylate, mixing the TPU dispersion and the solvent in the container to form a mixture of the TPU dispersion and solvent to a viscosity of 1 centipoise to 2,000 centipoise, and allowing the mixture to settle for approximately 30 minutes.

BRIEF DESCRIPTION OF THE DRAWINGS

The teaching of the present disclosure can be readily understood by considering the following detailed description in conjunction with the accompanying drawings, in which:

FIG. 1 illustrates a flow chart of an example method for producing a printable flexible overcoat ink of the present disclosure.

To facilitate understanding, identical reference numerals have been used, where possible, to designate identical elements that are common to the FIGURES.

DETAILED DESCRIPTION

The present disclosure is related to a printable flexible overcoat ink composition and a method for making the same. As discussed above, printed electronics is an emerging industry that aims to print low cost electronic components. However, the currently available digitally printable conductive inks suffer drawbacks, such as not being flexible, having low scratch resistance, and poor adhesion.

The present disclosure provides a solution to the issues associated with digitally printable conductive inks. The present disclosure provides a printable flexible overcoat layer on top of the delicate conductive traces of the printed electronics. Besides flexibility and digital printability, the printable flexible overcoat ink of the present disclosure provides compatibility and strong adhesion to the conductive traces of the printed electronics. The printable flexible overcoat ink composition also provides strong scratch resistance.

In one embodiment, the printable overcoat ink composition may include a mixture of a thermoplastic polyurethane (TPU) latex dispersion and at least one additional solvent. The mixture of the TPU and the solvent or solvents may be an emulsion that is mixed to have a viscosity that allows the printable overcoat ink composition to be digitally printed via an inkjet printhead or an aerosol jet printhead. In one embodiment, the viscosity may be between approximately 1 centipoise to 2,000 centipoise.

TPU may be a type of polyurethane plastic that has properties of elasticity, transparency, and resistance to abrasion or scratches. The TPU may be an elastomer that consists of linear segmented block copolymers composed of hard and soft segments. The TPU in its raw form cannot be digitally printed. However, the embodiments of the present disclosure formulate the TPU with a solvent to a desired viscosity to allow the TPU to be digitally printed (e.g., over conductive traces on a printed circuit board).

In one embodiment, the mixture may be formed with TPU that has an average diameter of approximately 1 nanometer (nm) to 1,000 nm. In one embodiment, the TPU may have an average diameter of approximately 5 nm to 500 nm. In one embodiment, the TPU may have an average diameter of approximately 10 nm to 200 nm.

In one embodiment, the TPU may be dispersed as a latex dispersion. In other words, the TPU dispersion may include a stable dispersion of the TPU particles in water. Notably, the TPU is not dissolved in the water, but remains in a solid form evenly dispersed in the solution (e.g., a colloidal dispersion). The TPU latex dispersion may be purchased from a variety of vendors such as Alberdingk Boley Inc., Covestro, and the like under the tradenames of Alberdingk U 410, Alberdingk U 615, Alberdingk U 2101, Bayhydrol U2757, Bayhydrol U2559, Bayhydrol 2606, and the like.

In one embodiment, the solvent may be a high boiling point solvent. The high boiling point of the solvent may allow the mixture of the TPU and solvent to remain stable when stored in a cartridge for printing at room temperature. In other words, the high boiling point solvent may enable stable printing of the ink in both inkjet printing and aerosol jet printing, and ensure that the mixture does not dry out or evaporate inside of a reservoir (e.g., the printhead). The solvents may be selected from groups of solvents that are compatible with the TPU dispersion (e.g., the solvent does not disrupt the TPU dispersion). Examples of the solvents that can be used may include water, ethylene glycol, diethylene glycol, sulfolane, or any combination thereof.

In one embodiment, the amount of TPU in a dispersion form and solvent in the mixture may have a ratio of approximately 1:1 to 1:20 of TPU to solvent for inkjet printers and approximately 10:1 to 1:20 for aerosol jet printers.

In one embodiment, the amount of TPU to solvent may range from approximately 1:4 to 2:1. In one embodiment, the amount solid TPU to solvent may have a ratio of approximately 1:8 for inkjet printers and approximately 1:4 for aerosol jet printers. Thus, the ratios may vary based on whether the TPU in a dispersion form is measured or the solid TPU is measured. In one embodiment, the total solid content of the TPU in the mixture may be approximately 1 percent to 60 percent. In one embodiment, the solid content may be approximately 10-25 percent. In one embodiment, the solid content may be approximately 5-15 percent.

In one embodiment, a printable flexible overcoat ink composition may be formulated for an inkjet printhead. For example, the printable flexible overcoat ink composition may be formulated with a ratio of 1:2 (e.g., of weight) of TPU dispersion to solvent. The printable flexible overcoat ink composition may have a total solid TPU content of approximately 13 percent by weight. The mixture may be mixed to have a viscosity of approximately 1-40 centipoise.

The printable flexible overcoat ink composition may be formulated such that the composition can be digitally printed without clogging printheads and/or quickly evaporating out of the printhead reservoir. The composition may also remain flexible after printing and curing to protect conductive traces.

Inkjet Printer Example

In one embodiment, a mixture of 1.0 grams of Alberdingk U615 and 2.0 grams of ethylene glycol was loaded into a glass vial. The mixture was vortexed to mix the Alberdingk U615 and the ethylene glycol well. The mixture was allowed to settle for approximately 30 minutes. The mixture had a viscosity of approximately 5-14 centipoise. The mixture was produced to have a total solid TPU content of approximately 13 percent.

In a second embodiment, a mixture of 1.0 grams of Alberdingk U615 and 1.0 grams of ethylene glycol was loaded into a glass vial. The mixture was vortexed to mix the Alberdingk U615 and the ethylene glycol well. The mixture was allowed to settle for approximately 30 minutes. The mixture was produced to have a total solid TPU content of approximately 20 percent.

In a third embodiment, a mixture of 1.0 grams of Alberdingk U2101 and 2.0 grams of ethylene glycol was loaded into a glass vial. The mixture was vortexed to mix the Alberdingk U2101 and the ethylene glycol well. The mixture was allowed to settle for approximately 30 minutes. The mixture was produced to have a total solid TPU content of approximately 13 percent.

A Dimatix 2300 printer was used for inkjet printing the mixture. The mixture was printed over conductive traces on a substrate at a temperature of approximately 25.2 degrees Celsius (° C.), at a drop mass of 5.6 nanograms (ng), and at a velocity of 7 meters per second (m/s). The printed overcoat ink was baked in an oven at 120° C. for 10 minutes.

The printed overcoat ink produced a uniform film over the conductive traces. The printed overcoat ink was found to have high adhesion. The strength of the printed overcoat ink was shown via fold testing and survived 10 plus folding cycles, where one cycle is defined as a 180 degree inward fold and a 360 degree outward fold. The printed overcoat ink also was shown to maintain integrity after being scratched with the tip of sharp tweezers. The conductive traces were found to still be conductive after the fold test when protected by the printed overcoat ink.

The mixture was found to still print after several hours of use. No clogging of the inkjet printhead was observed after three hours of use.

Aerosol Jet Printer Example

In a first embodiment, a mixture of 15.0 grams of Alberdingk U615 and 10.0 grams of diethylene glycol was loaded into a glass vial. The mixture was vortexed to mix the Alberdingk U615 and the diethylene glycol well. The mixture was allowed to settle for approximately 30 minutes. The mixture had a viscosity of approximately 76.51 centipoise. The mixture was produced to have a total TPU content of approximately 24 percent after a 3:2 dilution.

In a second embodiment, a mixture of 15.0 grams of Alberdingk U410 and 10.0 grams of diethylene glycol was loaded into a glass vial. The mixture was vortexed to mix the Alberdingk U410 and the diethylene glycol well. The mixture was allowed to settle for approximately 30 minutes. The mixture was produced to have a total TPU content of approximately 24 percent.

In a third embodiment, mixture of 15.0 grams of Alberdingk U615 and 15.0 grams of ethylene glycol was loaded into a glass vial. The mixture was vortexed to mix the Alberdingk U615 and the diethylene glycol well. The mixture was allowed to settle for approximately 30 minutes. The mixture was produced to have a total TPU content of approximately 20 percent.

The mixture of the first embodiment in the aerosol jet printer example was printed using an aerosol jet printer using deionized water in the bubbler to prevent the ink from being concentrated and thus prevent a film forming process from happening in the printing system. The mixture printed well in the aerosol jet printer for several hours without clogging. The printing conditions of the aerosol jet printer are provided below in Table 1:

TABLE 1

| AEROSOL JET PRINTING CONDITIONS | | |
|---|---|---|
| | Flow rate (standard cubic centimeters per minute) | Pressure (pounds per square inch) |
| Sheath | 400 | 0024 |
| Atomization | 900 | 22.05 |
| Exhaust | 600 | 0 |

The printed overcoat ink was printed over several different substrates, such as Clearwater carton board, polycarbonate, and polyethylene naphthalate (PEN). The printed overcoat ink was baked in an oven at 120° C. for 10 minutes.

The printed overcoat ink produced a uniform film over the conductive traces. The printed overcoat ink was found to have high adhesion. The strength of the printed overcoat ink was shown via fold testing and survived 10 plus folding cycles, where one cycle is defined as a 180 degree inward fold and a 360 degree outward fold. The printed overcoat ink also was shown to maintain integrity after being scratched with the tip of sharp tweezers. The conductive traces were found to still be conductive after the fold test when protected by the printed overcoat ink.

It should be noted that the formulations for the printable flexible overcoat ink composition are provided as examples for inkjet printing and aerosol jet printing. However, the formulation and the printable flexible overcoat ink composition may be adjusted for any desired digital printing application. For example, the size of the TPU particles, type of solvent and the amount of solvent mixed with the TPU may be adjusted to tune the viscosity for a particular printing application.

FIG. 1 illustrates a flow chart of an example method 100 for producing a printable flexible overcoat ink of the present disclosure. The method 100 may be performed by various devices under the control of a processor or may be performed manually by technicians using various types of equipment.

At block 102, the method 100 begins. At block 104, the method 100 provides a thermoplastic polyurethane (TPU) dispersion having an average particle diameter of approximately 10 nanometers to 200 nanometers in a container. The TPU may be purchased from a TPU producing vendor under various different trade names. The TPU may be a polyurethane plastic that has properties of elasticity, transparency, and resistance to abrasion or scratches.

At block 106, the method 100 provides a solvent in the container, wherein the solvent comprises at least one of: water, ethylene glycol, diethylene glycol, sulfolane, propylene glycol methyl ether acetate, propylene glycol monomethyl ether acetate, di(propylene glycol) methyl ether acetate, (propylene glycol) methyl ether, di(propylene glycol) methyl ether, methyl isobutyl ketone, diisobutyl ketone, butyl acetate, methoxypropylacetate, or propoxylated neopentylglycoldiacrylate. The solvent may be a high boiling point solvent such that the mixture of the TPU and the solvent may remain stable in a reservoir (e.g., be stored without quickly evaporating).

In one embodiment, the amount of TPU and solvent may vary depending on a type of printing application that is used to digitally print the printable flexible overcoat ink. For example, for an inkjet printer, the TPU and solvent may be provided in a ratio of approximately 1:8 by weight of TPU to solvent. For example, the solvent may be ethylene glycol and 2 grams of the ethylene glycol can be mixed with 1 gram of the TPU dispersion.

In one embodiment, for an aerosol jet printer, the TPU and the solvent may be provided in a ratio of approximately 3:2 by weight of TPU to solvent. For example, the solvent may be diethylene glycol and 10 grams of the diethylene glycol can be mixed with 15 grams of TPU.

At block 108, the method 100 mixes the TPU dispersion and the solvent in the container to form a mixture of the TPU dispersion and solvent having a viscosity of 1 centipoise to 2,000 centipoise. For example, for the inkjet printer, the mixture can be mixed to a viscosity of approximately 1 centipoise to 40 centipoise. For an aerosol jet printer, the mixture can be mixed to a viscosity of approximately 1 centipoise to 2,000 centipoise.

At block 110, the method 100 allows the mixture to settle. For example, the mixture may be allowed to settle for approximately 30 minutes. The mixture may then be transferred to a printhead and dispensed via the desired printing method. The mixture may be digitally printed onto conductive traces formed on a substrate. For example, a digital printer may have a processor that includes instructions related to where the conductive traces are located on the substrate. The processor may control the movement of the printhead to dispense the mixture onto known locations of the conductive traces. In one embodiment, after the mixture is printed onto the conductive traces, the printed flexible overcoat ink may be cured to dry. However, after curing, the printed flexible overcoat ink may remain flexible and provide protection for the conductive traces.

It should be noted that the printed flexible overcoat ink is not globally applied over the entire surface of the printed circuit. Rather, the printed flexible overcoat ink of the present disclosure is formulated to be selectively dispensed or printed on to specific locations on the printed circuit. Thus, less material is used for cost savings. In addition, digitally printing the printed flexible overcoat ink may prevent dispensing the printed flexible overcoat ink on undesirable locations of the printed circuit. At block 112, the method 100 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A printable flexible overcoat ink composition, consisting of:
a mixture of a thermoplastic polyurethane (TPU) dispersion and a solvent, wherein the mixture has a viscosity of 1 centipoise to 2,000 centipoise to allow the mixture to be digitally printed, wherein a ratio of the TPU dispersion to solvent comprises approximately 1:1 to 1:20 for an inkjet printhead and approximately 10:1 to 1:20 for an aerosol jet printhead, wherein the solvent comprises a high boiling point solvent comprising at least one of: ethylene glycol, diethylene glycol, sulfolane, propylene glycol methyl ether acetate, propylene glycol monomethyl ether acetate, di(propylene glycol) methyl ether acetate, (propylene glycol) methyl ether, di(propylene glycol) methyl ether, methyl isobutyl ketone, diisobutyl ketone, butyl acetate, methoxypropylacetate, or propoxylated neopentylglycoldiacrylate.

2. The printable flexible overcoat ink composition of claim 1, wherein the viscosity of the mixture comprises approximately 1 centipoise to 40 centipoise to be dispensed via the inkjet printhead.

3. The printable flexible overcoat ink composition of claim 2, wherein a total solid content of the TPU dispersion in the mixture comprises approximately 1 percent to 60 percent.

4. The printable flexible overcoat ink composition of claim 1, wherein the viscosity of the mixture comprises approximately 1 centipoise to 2,000 centipoise to be dispensed via the aerosol jet printhead.

5. The printable flexible overcoat ink composition of claim 4, wherein a total solid content of the TPU dispersion in the mixture comprises approximately 1 percent to 80 percent.

6. A printable flexible overcoat ink composition, consisting of:

a mixture of a latex dispersion of thermoplastic polyurethane (TPU) and a solvent, wherein a ratio of the latex dispersion of TPU to solvent comprises approximately 1:4 to 2:1 and a total solid content of the latex dispersion of TPU in the mixture comprises approximately 1 percent to 80 percent, wherein the solvent comprises a high boiling point solvent comprising at least one of: ethylene glycol, diethylene glycol, sulfolane, propylene glycol methyl ether acetate, propylene glycol monomethyl ether acetate, di(propylene glycol) methyl ether acetate, (propylene glycol) methyl ether, di(propylene glycol) methyl ether, methyl isobutyl ketone, diisobutyl ketone, butyl acetate, methoxypropylacetate, or propoxylated neopentylglycoldiacrylate.

7. The printable flexible overcoat ink composition of claim 6, wherein the mixture comprises a viscosity of approximately 1 centipoise to 2,000 centipoise to be dispensed via an aerosol jet printhead.

8. The printable flexible overcoat ink composition of claim 6, wherein a ratio of the latex dispersion of TPU to solvent comprises approximately 1:1 to 1:20 for an inkjet printhead.

9. The printable flexible overcoat ink composition of claim 6, wherein a ratio of the latex dispersion of TPU to solvent comprises approximately 10:1 to 1:20 for an aerosol jet printhead.

10. The printable flexible overcoat ink composition of claim 6, wherein the mixture comprises a viscosity of approximately 1 centipoise to 40 centipoise to be dispensed via an inkjet printhead.

11. The printable flexible overcoat ink composition of claim 10, wherein a total solid content of the latex dispersion of TPU in the mixture comprises approximately 1 percent to 60 percent.

* * * * *